United States Patent

Alperovich et al.

[11] Patent Number: 6,101,393
[45] Date of Patent: Aug. 8, 2000

[54] SELECTIVE ACCEPTANCE OF SHORT MESSAGE SERVICE (SMS) MESSAGES IN A CELLULAR TELEPHONE NETWORK

[75] Inventors: Vladimir Alperovich, Dallas; David Boltz, Garland, both of Tex.

[73] Assignee: Ericsson Inc., Research Triangle Park, N.C.

[21] Appl. No.: 08/975,379

[22] Filed: Nov. 20, 1997

[51] Int. Cl.[7] .................................................. H04Q 7/20
[52] U.S. Cl. ........................... 455/466; 370/278; 370/328
[58] Field of Search ............................. 455/466; 370/278, 370/328

[56] References Cited

U.S. PATENT DOCUMENTS

| | | | |
|---|---|---|---|
| 5,577,102 | 11/1996 | Koivunen | 455/466 |
| 5,652,572 | 7/1997 | Kido et al. | 455/466 |
| 5,678,179 | 10/1997 | Turcotte et al. | 455/466 |
| 5,794,142 | 8/1998 | Venttila et al. | 455/466 |
| 5,806,000 | 9/1998 | Vo et al. | 455/466 |
| 5,878,347 | 3/1999 | Joensuu et al. | 455/466 |
| 5,930,239 | 7/1999 | Turcotte | 455/466 |
| 6,026,296 | 2/2000 | Sanders, III et al. | 455/466 |

FOREIGN PATENT DOCUMENTS

| | | |
|---|---|---|
| WO96/03843 | 2/1996 | WIPO . |
| WO97/27713 | 7/1997 | WIPO . |
| WO97/33421 | 9/1997 | WIPO . |

*Primary Examiner*—Huy D. Vu
*Assistant Examiner*—Dung Trinh
*Attorney, Agent, or Firm*—Jenkens & Gilchrist

[57] ABSTRACT

Selective acceptance of short messages enables a cellular subscriber to predetermine which short message will actually be delivered to the subscriber's mobile station. Using an Unstructured Supplementary Service Data (USSD) transmission, the subscriber determines which selection criteria will be used and then builds in the network Home Location Register (HLR) a list of originating entities from which short messages will either be accepted or rejected. A screening application resident on the HLR then determines the identity of the entity associated with any request for short message routing information and causes the short message to be delivered or deleted according to the input provided by the subscriber. A confirmation message is returned to the originating entity indicating delivery or the reason for failure.

18 Claims, 6 Drawing Sheets

SELECTIVE ACCEPTANCE OF SHORT MESSAGE SERVICE (SMS) MESSAGES IN A CELLULAR TELEPHONE NETWORK

BACKGROUND OF THE INVENTION

1. Technical Field of the Invention

The present invention relates to cellular telephone networks and, in particular, to a system, device, and method for the selective acceptance and rejection of point-to-point short messages.

2. Description of the Related Art

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

In order to promote compatibility of the equipment and operations of various Public Land Mobile Networks (PLMN), standards have been developed and are currently being implemented. One such standard is the Global System for Mobile Communications (GSM).

With the introduction of GSM digital-based telecommunications systems, a number of advanced non-speech services are further provided to mobile subscribers. One such service includes a point-to-point Short Message Service (SMS). Using an SMS message, a mobile subscriber is able to communicate text messages with another Mobile Station (MS) or an SMS terminal without establishing a circuit connection. A first mobile subscriber simply types the desired text message, indicates the directory number associated with the destination mobile subscriber, and transmits the SMS message encapsulating the desired text message.

One shortcoming of existing SMS implementations, however, is the lack of any ability to selectively block delivery of point-to-point SMS messages directed at a particular MS. In the case of circuit-connection cellular communication, a subscriber can specify that calls from certain parties not be accepted, a utility that saves both time and money. No analogous utility, however, is currently available for use in blocking unwanted SMS messages. In fact, the only current solution is for the subscriber to personally receive and screen all messages to select those that are actually desired. Accordingly, there is a need for a screening mechanism so that a subscriber can specify from which senders SMS messages will be accepted or rejected.

SUMMARY OF THE INVENTION

To address that foregoing and other problems, the present invention proposes a new screening mechanism for selectively accepting and rejecting Short Message Service (SMS) messages. Located within the Public Land Mobile Network's (PLMN) Home Location Register (HLR), the new screening mechanism determines the Mobile Station-Integrated Services Digital Network (MSISDN) number (or other origin identifier) of an entity attempting to locate a particular mobile subscriber for the purpose of sending an SMS transmission.

A screening application then compares this unique identifier to one of two lists stored in the HLR. The first of the two lists contains all MSISDN numbers from which SMS messages are to be accepted, and the second list contains all MSISDN numbers from which SMS messages may not be accepted. The screening mechanism is activated when the HLR is interrogated by the SMS Gateway Mobile Services Switching Center (SMS-GMSC) for the location of the intended SMS-message recipient. If the screening mechanism determines that the incoming SMS message is to be accepted, or alternately not rejected, then routing information is transmitted and the SMS message is delivered or remains buffered in the usual fashion. If, however, the SMS message is from an entity listed as one from which SMS messages should be rejected, or not accepted, then the HLR indicates that the message should not be delivered. The subscriber chooses which list will be used for the SMS screening function and builds, amends, or reselects a list by initiating an Unstructured Supplementary Service Data (USSD) transmission directly from the MS.

A more complete appreciation of the present invention and the scope thereof can be obtained from the accompanying drawings which are briefly described below, the following detailed description of the presently-preferred embodiments of the invention, and the appended claims.

BRIEF DESCRIPTION OF THE DRAWINGS

A more complete understanding of the method and apparatus of the present invention may be obtained by reference to the following detailed description when taken in conjunction with the accompanying drawings, wherein.

DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
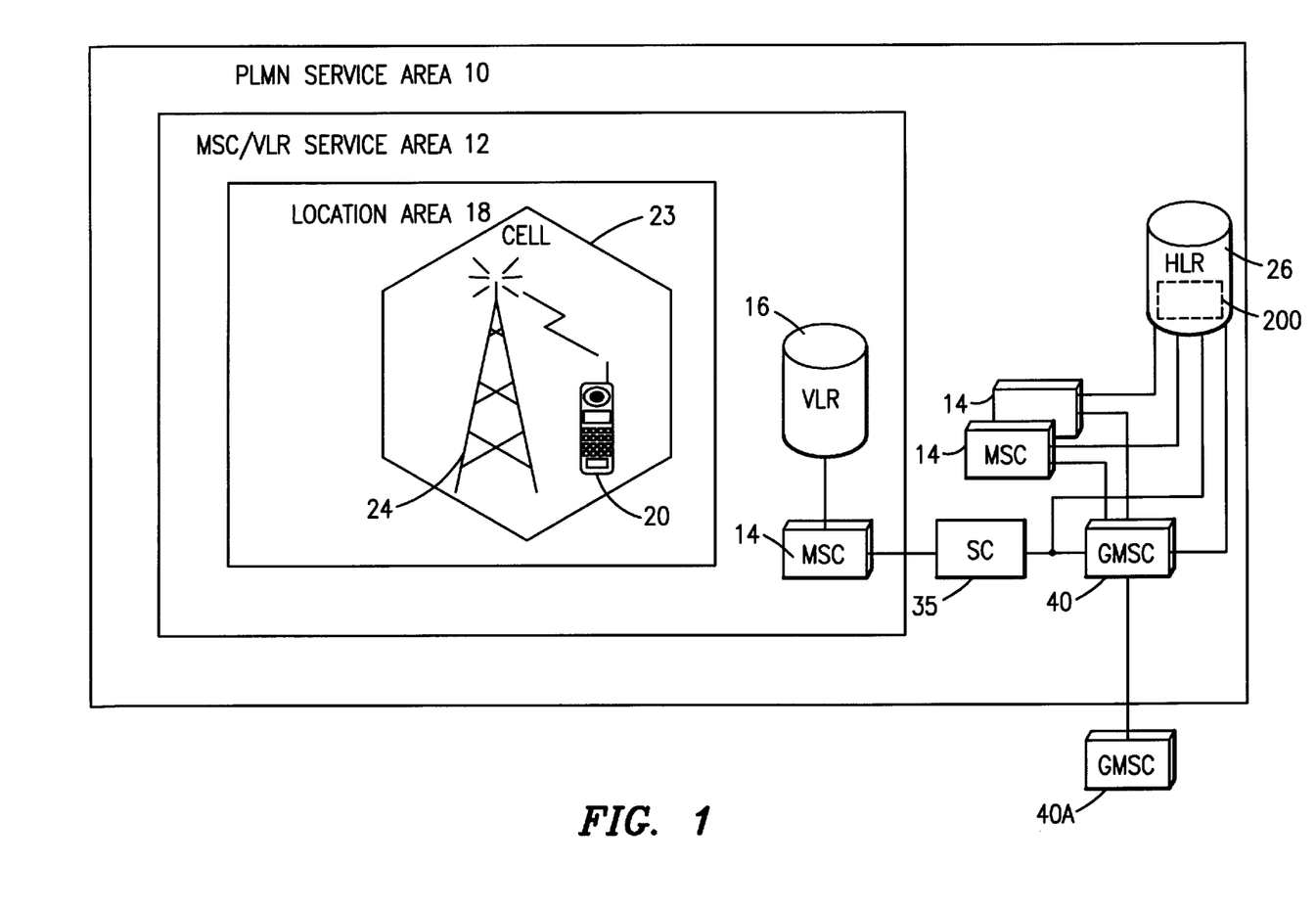
FIG. 1 is a block diagram of a telecommunications system according to the present invention.

With reference to FIG. 1 of the drawings, there is illustrated Public Land Mobile Network (PLMN) 10, such as cellular network incorporating SMS capability, which in turn is composed of a plurality of areas 12, each having a Mobile Switching Center (MSC) 14 and integrated Visitor Location Register (VLR) 16 therein. The MSC/VLR areas 12, in turn, include a plurality of Location Areas (LA) 18. An LA 18 is that part of a given MSC/VLR area 12 in which a mobile station (MS) 20 may move freely without having to send update location information to the MSC/VLR that controls that LA 18. Each Location Area 18 is divided into a number of cells 23. MS 20 is the physical equipment, e.g., a car phone or other portable phone, used by mobile subscribers to communicate with the cellular network 10. A Base Station (BS) 24 is the physical equipment, illustrated for simplicity as a radio tower, that provides radio coverage to the geographical area of the cell 23 in which to handle radio traffic to and from the MS 20.

With further reference to FIG. 1, the PLMN Service Area or cellular network 10 includes a Home Location Register (HLR) 26, which is a database maintaining all subscriber information, e.g., user profiles, current location and routing information, and other administrative information. In the preferred embodiment of the present invention, an SMS message screening mechanism 200 is located on the system HLR 26. The HLR 26 itself may be co-located with a given MSC 14 or may service multiple MSCs 14; the latter configuration being illustrated in FIG. 1.

Figure 2:
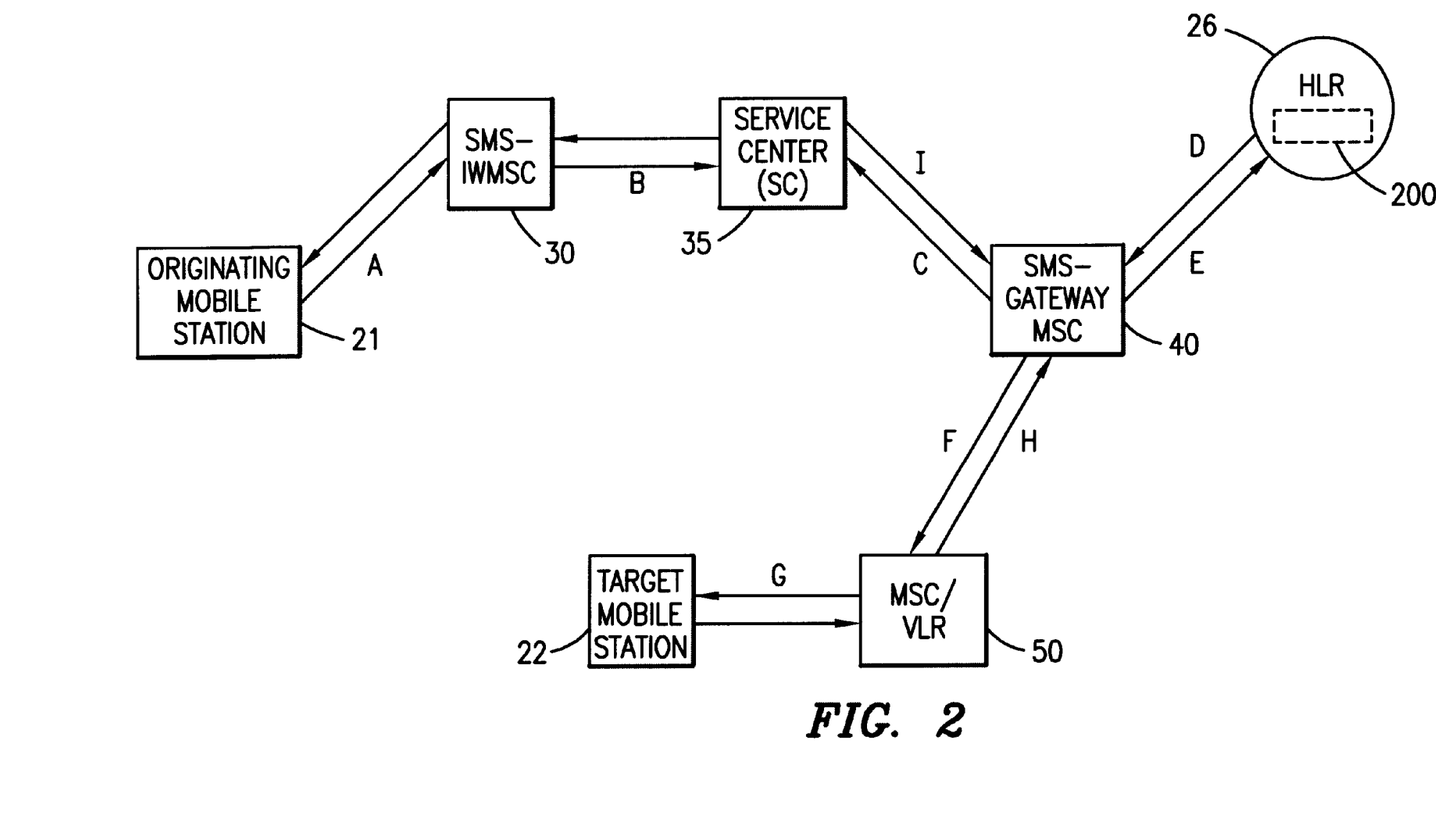
FIG. 2 is a block diagram of a telecommunications system illustrating the routing of an SMS message between two mobile stations according to the present invention.

With reference now to FIG. 2, there is shown a block diagram of a telecommunications system illustrating the routing of an SMS message (reference identifier A) between two mobile stations according to the present invention. An originating MS 21 transmits an SMS message (reference identifier A) toward an SMS-Interworking MSC (SMS-IWMSC) 30 of the MSC/VLR area 12 in which it is located. Accompanying the transmitted SMS message is an origin identifier, which is a datum, such as an MSISDN number, that uniquely identifies the MS or other entity originating the SMS message. Also accompanying the SMS message is a destination number identifying the target recipient MS 22, also illustrated in FIG. 2. With reference now to both FIGS. 1 and 2, the SMS message is then transmitted (reference identifier B) from the SMS-IWMSC 30 to a Service Center (SC) 35, which buffers the short message and then transmits (reference identifier C) the short message to an SMS Gateway Mobile Switching Center (SMS-GMSC) 40, also referred to herein as gateway 40, corresponding to the SMS message destination number. The originating MS identifier is included by the SC 35 when the short message is sent to gateway 40. With further reference to FIG. 1, there is illustrated another gateway 40A, connected to the gateway 40 and outside the PLMN 10. In this manner, MSs in adjacent networks can be serviced, as is understood in the art.

To determine the current location of the target MS 22, the gateway 40 interrogates (reference identifier D) a corresponding HLR 26. In this embodiment, it is assumed that screening mechanism 200, the operation of which is explained more fully below, approves message delivery. The SMS gateway 40 communicates with the HLR 26 to ascertain the particular destination MSC 14 (in FIG. 1) and 50 (in FIG. 2) that is serving the target MS 22. The serving MSC 50 identity is then transmitted (reference identifier E) back to the gateway 40, which uses it to re-route (reference identifier F) the SMS message from the gateway 40 to the particular destination MSC/VLR 50. The destination MSC/VLR 50, upon receipt of the SMS message, then forwards (reference identifier G) the SMS message to the intended recipient, MS 22, and sends an acknowledgment signal (reference identifier H) back to gateway 40 indicating successful delivery. The gateway 40 then forwards (reference identifier I) the acknowledgment signal back to the SC 35.

In this way, short text messages can be sent from one MS to another without the necessity of establishing an actual circuit connection. It should also be understood that since the message can be buffered, as explained more fully below, the corresponding MSs do not even have to be activated simultaneously for transmission to eventually occur.

Figure 3:
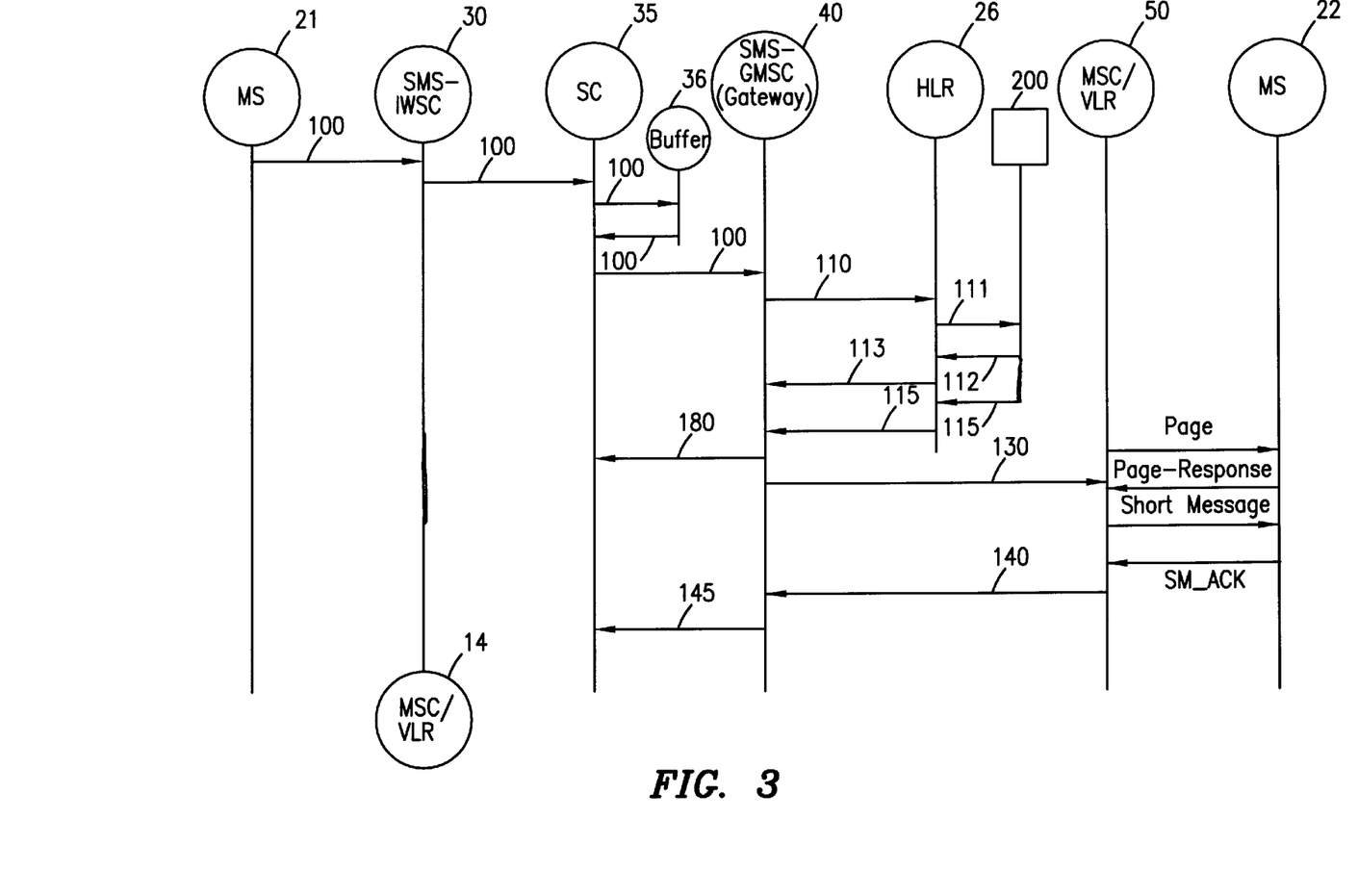
FIG. 3 is a signal flow and operation network operation diagram illustrating selective delivery of an SMS message in accordance with the present invention.

Reference is now made to FIG. 3, which is a signal flow and network operation diagram illustrating a preferred method for selectively delivering point-to-point SMS messages according to the present invention. The SMS message, designated by the reference numeral 100, generated by the originating MS 21 is first transmitted to the SMS-IWMSC 30 of the MSC/VLR area where the MS 21 is currently located, as described in connection with FIG. 2. The SMS-IWMSC 30 then routes the SMS transmission to the network SC 35, which buffers the message, e.g., on an external media or buffer 36 shown in FIG. 3, until delivery occurs, until delivery is rejected, or until a predetermined delivery delay time has expired. Upon the occurrence of the pertinent event, the SC 35 then transfers the message to the SMS-GMSC 40. As discussed the SMS message preferably includes the unique origin identifier of the MS 21. The SMS-GMSC 40 then queries the HLR 26 for the present location of the intended SMS recipient MS 22 by transmitting a Send_Routing_Information_for_SMS request, represented by reference numeral 110, which also contains the origin identifier.

In this preferred embodiment of the invention, the screening mechanism 200 in HLR 26, upon receiving a query from the gateway 40, extracts the aforedescribed origin identifier from the SMS message, designated in FIG. 3 by reference numeral 111. The screening mechanism 200. then determines whether the SMS incoming message should be accepted or rejected, based on preselected acceptance criteria, as explained more fully below. If the acceptance criteria is met, the screening mechanism 200 sends a delivery-acceptance signal, represented by reference numeral 112, to the HLR 26. In turn, the HLR 26 sends a Send_Routing_Information_for_SMS_ACK message, represented by reference numeral 113, notifying the gateway 40 of the target MS 22's location. Based on this location information, the gateway 40 then transfers the SMS message, represented by reference numeral 130, preferably via Mobile Application Part (MAP) MAP_Forward_Short_Message signal, to the appropriate destination MSC 50 for delivery to the MS 22.

The destination MC/VLR 50 serving the MS 22, then pages (PAGE) the MS 22 and upon reception of a PAGE_RESPONSE, forwards the SHORT MESSAGE to the MS 22. Upon completion, the MS 22 sends an SM_ACK signal back to the MSC/VLR 50, which then sends a MAP Forward_SM_ACK, represented by reference numeral 140, back to the gateway 40, which, in turn, forwards the acknowledgment (delivery report) back to the SC 35, represented by reference numeral 145.

If, however, the MS 22 is unavailable, e.g., turned off or out of range, then the incoming SMS message 100 from the MS 21 remains buffered for later delivery, e.g., on the external media or buffer 36. If the buffered SMS message 100 cannot be delivered after a predetermined delivery-delay period, then.

With further reference to FIG. 3, if the screening mechanism 200 in the HLR 26 determines that the selection criteria is not met, then the screening mechanism 200 within the HLR 26 sends a delivery rejection signal 115 back to gateway 40 instead of the acceptance signal 112. Gateway 40 then forwards to the SC 35 a rejection (failure report) signal 180. The SC 35 then deletes the SMS message 100 from its SMS message external media or buffer 36.

Figure 4:
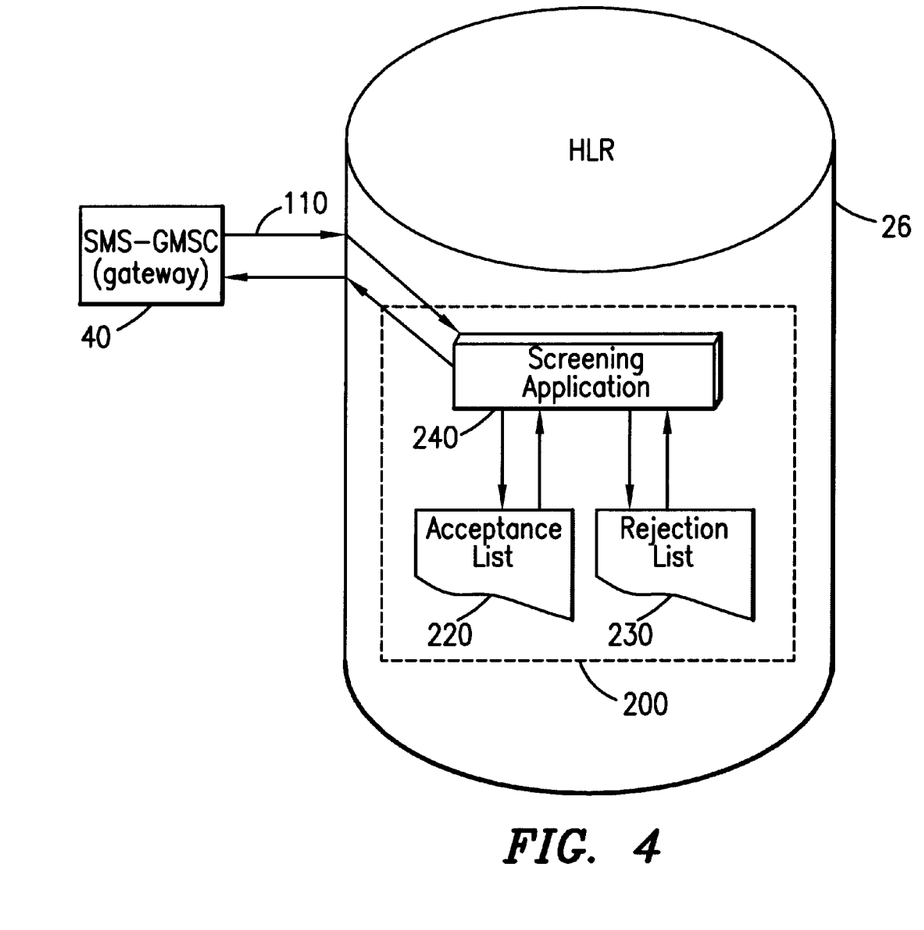
FIG. 4 is a block diagram illustrating the HLR signal flow for the screening mechanism of the present invention.

With reference now to FIG. 4, which is a block diagram illustrating an HLR 26 in accordance with the present invention, the HLR 26 contains within it the aforementioned screening mechanism 200. Screening mechanism 200 preferably includes a screening application 240 and two lists within the HLR 26 database, which are used to determine whether to allow delivery of an SMS message. The first list is an acceptance list 220 and the second a rejection list 230. When the gateway 40 interrogates the HLR 26 by transmitting the aforementioned Send_Routing_Information_for_SMS 110, the screening application 240 determines the identity of the originating MS (not shown in FIGS. 1 and 4) by extracting the aforedescribed origin identifier 111, shown in FIG. 3, from the query transmission 110. The screening application 240 then compares the origin identifier 111 to one of the lists 220, 230, as selected by the subscriber, to determine whether the SMS message should be delivered or rejected.

Figure 5:
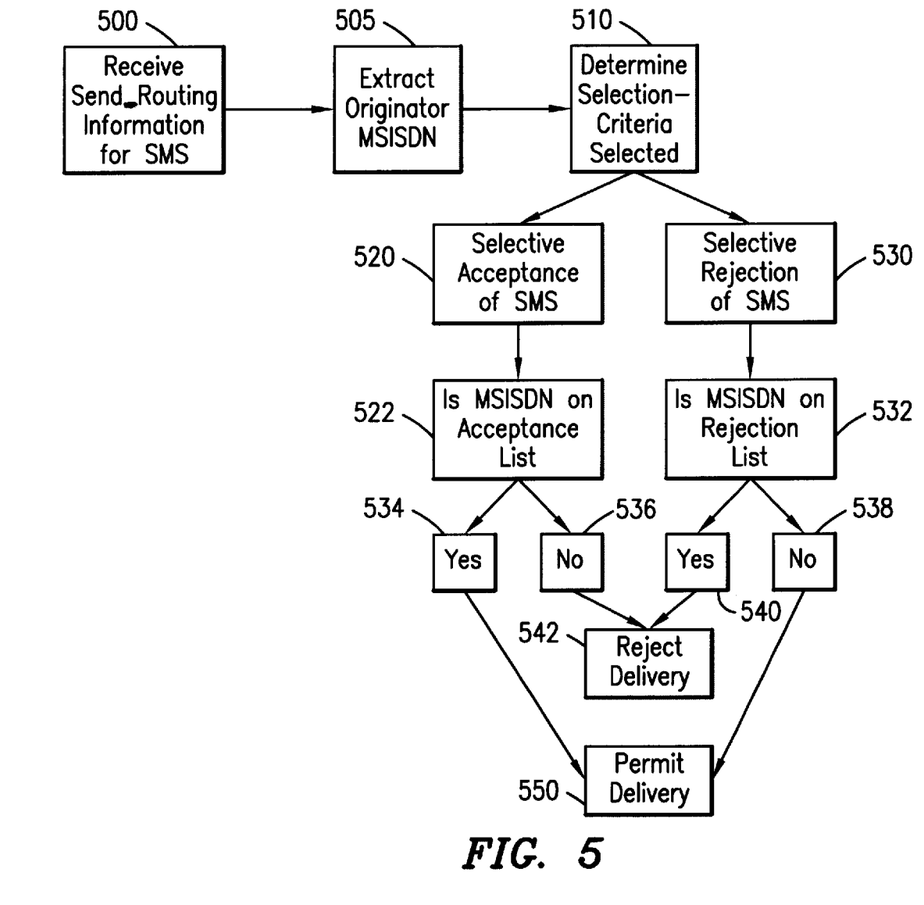
FIG. 5 is a flow chart illustrating the operation of the HLR-based SMS message screening mechanism in accordance with the present invention.

FIG. 5 is a flow chart illustrating a preferred operation of the screening mechanism 200 of the present invention, which is resident in the HLR 26 of the PLMN 10 (as shown in FIGS. 1 and 4). In this embodiment, it is assumed that the subscriber using the target MS 22 has already selected an SMS selective-delivery criteria and built the appropriate list. As described hereinbefore and further illustrated in FIG. 5, the HLR receives the Send_Routing_Information_for_SMS 110 at step 500 and extracts the origin identifier 111, e.g., an MSISDN, at step 505. Assuming the origin identifier 111 is present, the screening mechanism 200 next determines at step 510 which SMS-selection criteria has been selected. If selective acceptance of SMS is active (step 520), the MSISDN (or other origin identifier 111) is compared to the acceptance list 220 at step 522. If the origin identifier 111 is on the list (step 534), then SMS message delivery in the usual manner is permitted (step 550). If the origin identifier 111 of the originating MS is not present (step 536), delivery is rejected (step 542). If, on the other hand, the SMS-rejection of SMS is active, (step 530) the incoming origin identifier is compared to the rejection list 230 at step 532. If the originating MSISDN is absent from the list (step 538), indicating an acceptable incoming message, an SMS delivery is permitted (step 550). If, however, the origination MSISDN is on the rejection list (step 540), delivery is not permitted (step 542). Following completion of the aforedescribed SMS message screening, an appropriate message may be generated and returned to the originating MS, e.g., rejection signal 180 (shown in FIG. 3).

Figure 6:
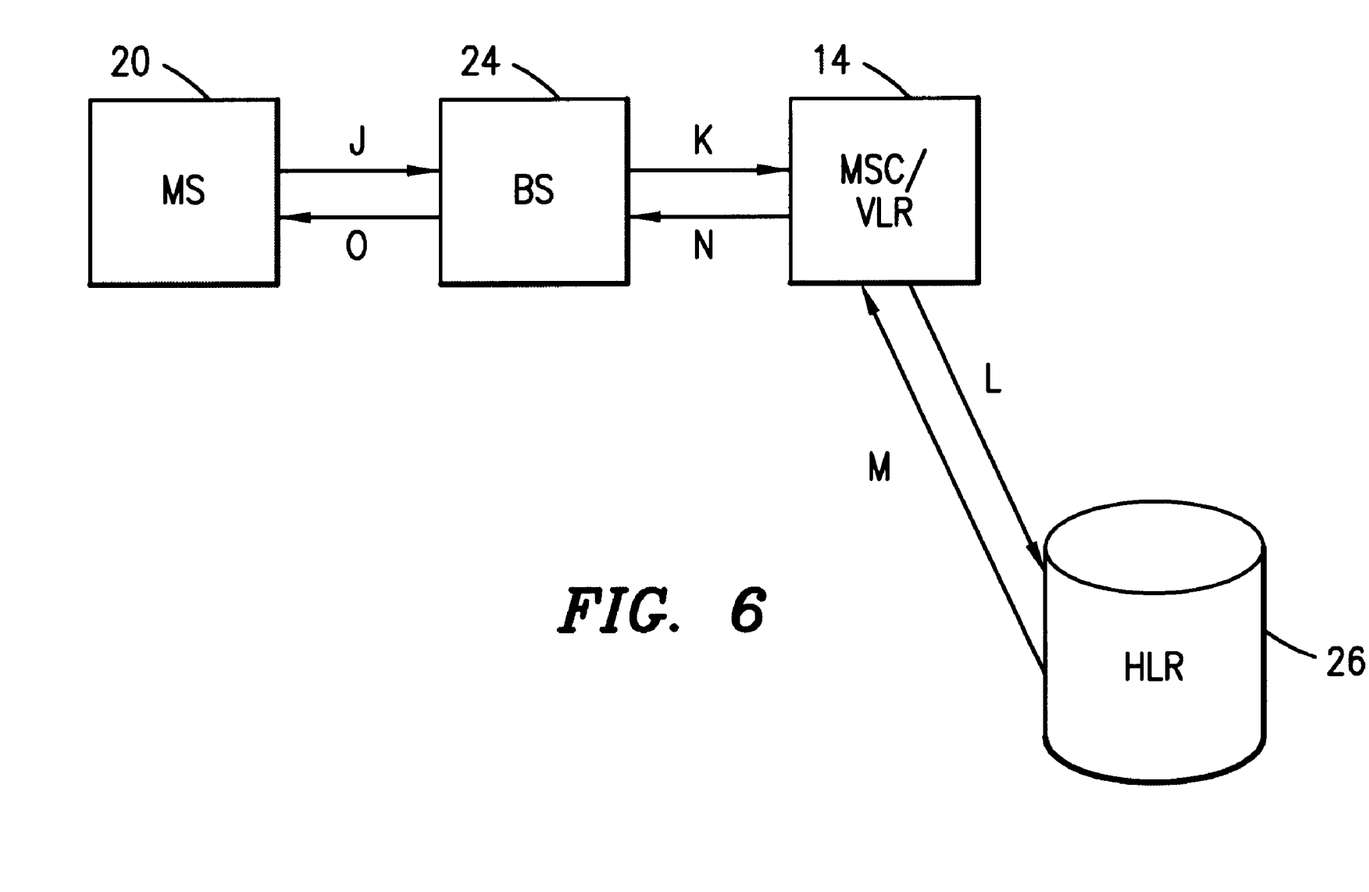
FIG. 6 is a block diagram illustrating the routing of a USSD transmission from a subscriber MS to the network HLR for inputting selective screening criteria in accordance with the present invention.

Reference is now made to FIG. 6, which is a block diagram showing components involved in the screening mechanism 200 update procedure. To change SMS delivery-selection criteria or add or remove MSISDN numbers from either respective list, 220 or 230, a subscriber simply initiates an update routine directly from the MS 20. In the preferred embodiment, the update routine is accomplished using an Unstructured Supplementary Service Data (USSD) procedure to interactively transmit the update information from the MS 20 to the BS 24 (step J) and then to the MSC/VLR 14 (step K) currently serving the MS 20, as also illustrated in FIG. 1. As shown in FIG. 6, the MSC/VLR 14 then sends (step L) the USSD update transmission on to the HLR 26. Preferably, the HLR 26 generates an acknowledgment signal (steps M–O) for transmission back to the MS 20, indicating the success or failure of the update procedure. Alternately, the update procedure could be performed as a series of steps, initiated by the subscriber who then responds to a series of inquiries from the HLR 26. In yet another embodiment, the SMS delivery-selection criteria could simply be added to the HLR 26 along with other subscriber information when service is initiated, presumably based on information provided by the new subscriber.

While in the preferred embodiment, the HLR 26 preferably has two lists associated with a particular mobile station, it is also within the scope of the invention that a single list, or more than two lists, may be used, and that such list or lists may be associated with more than one mobile station. For example, an organization supplying mobile phones to numerous employees may wish to restrict delivery of short messages to those originated at its own Internet site, or to those originated from the organization's mobile stations. Additionally, the origin identifiers listed on the lists could be something other than MSISDN or IMSI numbers associated with a single originating entity. An origin identifier could also include a group or type identifier. In this way, the origin identifier could even function as a password accompanying the transmission of a point-to-point short message.

Although an embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

The previous description is of a preferred embodiment for implementing the scope of the invention should not necessarily be limited by this description. The scope of the present invention is instead defined by the following claims.

What is claimed is:

1. A method for screening a short message to a mobile station within a telecommunications system, said method comprising the steps of:

creating, within a home location register in communication with said mobile station, at least one list of short message identifiers associated with said mobile station;

determining, in response to a short message routing inquiry for said mobile station to the home location register, a short message identifier associated with said short message to said mobile station; and comparing, within said home location register, said routing inquiry short message identifier to said short message identifiers in said list.

2. The method of claim 1, further comprising, after said step of comparing, the step of generating within said home location register, a deliverability status message for said short message.

3. The method of claim 1, wherein said step of determining further comprises extracting said short message identifier from said routing inquiry.

4. The method of claim 1, further comprising, after said step of comparing, the step of forwarding, from said home location register to a caller device originating said routing inquiry, routing information for routing said short message to said mobile station.

5. The method of claim 1, wherein said at least one list in said home location register contains identifiers associated with short message originators from which short messages are accepted for delivery to said mobile station.

6. The method of claim 1, wherein said at least one list in said home location register contains identifiers associated with short message originators from which short messages are rejected for delivery to said mobile station.

7. The method of claim 1, wherein said at least one list in said home location register comprises an acceptable short message identifier list and a non-acceptable short message identifier list, and further comprising, prior to said step of comparing, the step of determining which short message identification list to use in said comparing step.

8. A screening device for screening a short message to a mobile station within a telecommunications system, said screening device comprising:

a screening database within a home location register in communication with said mobile station, said database containing at least one list of short message identifiers therein;

extraction means for extracting, from a routing inquiry to the home location register, a short message identifier associated with said short message to said mobile station;

comparison means, within said home location register, for comparing the short message identifier extracted from said routing inquiry with a plurality of short message identifiers in said at least one list; and short message screening means, within said home location register, for screening said short message delivery, said short message being delivered to said mobile station if said extracted short message identifier matches at least one identifier in said list.

9. The screening device of claim 8, wherein said comparison means generates a status message after said comparing of said short message identifier from said routing inquiry to said plurality of short message identifiers in said at least one list.

10. The screening device of claim 8, further comprising modification means for modifying said at least one list by a transmission from said mobile station.

11. The screening device of claim 8, wherein said at least one list in said home location register contains identifiers associated with short message originators from which short messages are accepted for delivery to the mobile station.

12. The screening device of claim 8, wherein said at least one list in said home location register contains identifiers associated with short message originators from which short messages are rejected for delivery to the mobile station.

13. The screening device of claim 8, wherein at least one of said short message origin identifiers in said list is an MSISDN number.

14. A telecommunications system for controlling delivery of a short message to a mobile station, comprising:

a home location register having a screening database containing at least one list of short message identifiers associated with said mobile station within the telecommunications system;

extraction means for extracting, from a routing inquiry to said home location register, a short message identifier associated with said short message to said mobile station;

comparison means, within said home location register, for comparing the short message identifier extracted from said routing inquiry with a plurality of short message identifiers in said at least one list; and short message screening means, within said home location register, for screening said short message delivery, said short message being delivered to said mobile station if said extracted short message identifier matches at least one identifier in said list.

15. The telecommunications system of claim 14, wherein said short message screening means generates a message to a caller device originating said routing inquiry that said short message is acceptable for delivery to said mobile station.

16. The telecommunications system of claim 14, further comprising modification means for modifying said list in said screening database from said mobile station.

17. The telecommunications system of claim 14, wherein said list of short message identifiers comprises MSISDN numbers, said MSISDN numbers corresponding to respective caller devices from which said short message screening means allows said short message to pass to said mobile station.

18. The telecommunications system of claim 14, wherein said list of short message identifiers comprises MSISDN numbers, said MSISDN numbers corresponding to respective caller devices from which said short message screening means restricts said short message to pass to said mobile station.

* * * * *

UNITED STATES PATENT AND TRADEMARK OFFICE
CERTIFICATE OF CORRECTION

PATENT NO.   : 6,101,393
DATED        : August 8, 2000
INVENTOR(S)  : Alperovich, et al.

It is certified that error appears in the above-identified patent and that said Letters Patent is hereby corrected as shown below:

Column 4,
Line 32, after "200" delete -- . --
Line 62, replace "then" with -- it may be deleted --

Signed and Sealed this

Sixth Day of November, 2001

*Attest:*

*Nicholas P. Godici*

NICHOLAS P. GODICI
*Attesting Officer*   *Acting Director of the United States Patent and Trademark Office*